Jan. 3, 1967   M. A. HALL   3,295,650
COIN-CONTROLLED ACTUATOR
Original Filed April 27, 1964   5 Sheets-Sheet 1

INVENTOR.
MITCHELL A. HALL
BY
Kinney and Schenk
ATTORNEYS

Jan. 3, 1967 M. A. HALL 3,295,650
COIN-CONTROLLED ACTUATOR
Original Filed April 27, 1964 5 Sheets-Sheet 5

INVENTOR.
MITCHELL A. HALL
BY
ATTORNEYS

United States Patent Office 3,295,650
Patented Jan. 3, 1967

3,295,650
COIN-CONTROLLED ACTUATOR
Mitchell A. Hall, 445 Rossford Ave.,
Fort Thomas, Ky. 41075
Original application Apr. 27, 1964, Ser. No. 363,014, now Patent No. 3,231,059, dated Jan. 25, 1966. Divided and this application Mar. 4, 1965, Ser. No. 442,846
15 Claims. (Cl. 194—1)

This application is a division of my application Serial No. 363,014, filed April 27, 1964, now issued as U.S. Patent No. 3,231,059, dated January 25, 1966.

The present invention relates to a coin-controlled actuator, such as may be utilized for initiating operation of a dispensing machine or the like. The coin-controlled actuator of the invention is one of the type which is designed to initiate operation of an associated machine, following two or more reciprocations of a coin slide incorporated in the actuator.

An object of the invention is to provide an improved mechanism which is highly reliable and effective, to initiate operation of an associated service machine following two or more reciprocations of a coin slide.

Another object of the invention is to provide a durable and trouble-free coin-controlled actuator for the purpose stated, which may quickly and easily be converted for varying the number of coin slide reciprocations required to initiate operation of an associated service machine.

A further object is to provide an improved coin-controlled mechanism of the character stated, which is foolproof to a high degree and practically invulnerable to abusive forms of manipulation designed to obtain free play or unauthorized operation of the associated machine.

The foregoing and other objects are attained by the means described herein and illustrated upon the accompanying drawings, in which.

Figures 1, 2, 3:
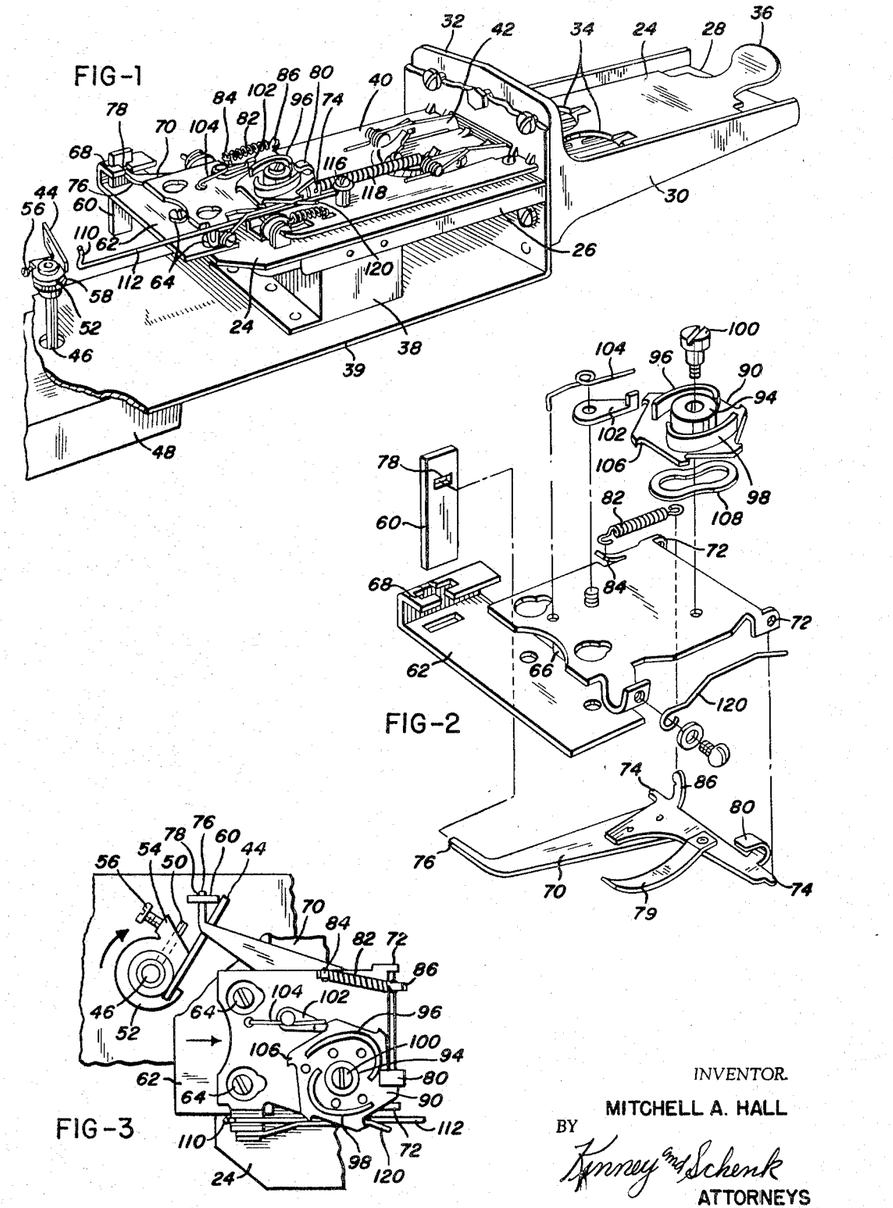
FIG. 1 is a perspective view of a coin-controlled actuator embodying the present invention.
FIG. 2 is an exploded perspective view of an indexing unit forming part of the invention.
FIG. 3 is a top plan view of the indexing unit, showing its operating relationship to a starter of a machine to be placed in operation.
Figure 4:
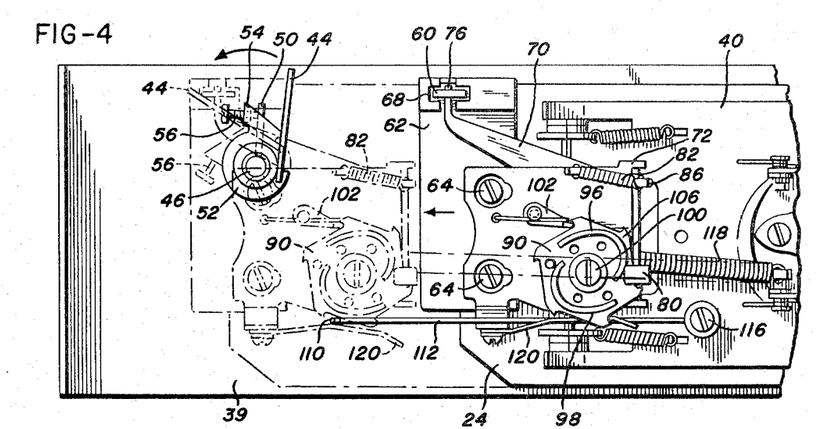
FIG. 4 is a top plan view of the apparatus illustrated by FIG. 1, with the coin slide thereof fully retracted and the machine starter at home position.
Figure 5:
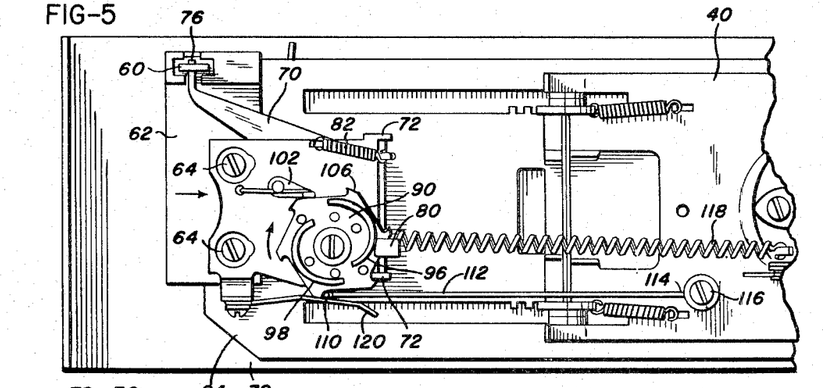
FIG. 5 is a view similar to FIG. 4, showing the coin slide under partial retraction.

With reference to FIGS. 1 to 3, the numeral 24 indicates a coin slide reciprocatively supported by a normally stationary base plate 26 which provides a track for the coin slide. Plate 26 may extend forwardly to the end 28 of a mounting bracket 30, which bracket has an upstanding leg 32 for attachment to a vertical wall of a cabinet (not shown), enclosing a dispensing machine or a service machine. When the coin slide is fully retracted as in FIG. 1, apertures 34 therein are exposed upon bracket 30 for the reception of coins. By means of a handle 36 on the coin slide, a patron upon inserting the proper coins may advance the slide for conveying the coins to a receptacle 38 on bracket 39, which accumulates the coins dropped from apertures 34. The fully advanced condition of the slide is illustrated by FIG. 5.

Base plate 26 and a stationary cover plate 40 therefor, may carry the usual coin testing devices such as calipers, magnets, stop fingers 42 and the like, to assure the rejection of improper coins and slugs. Such testing devices are of no concern to the present invention, and need not therefore be treated in detail.

In that form of the device illustrated by FIGS. 1 to 15, the numeral 44 indicates generally a starter in the form of an arm associated with a shaft 46, which shaft extends into the housing 48 of a drum switch of ordinary design. The drum switch may encase a number of electric contacts, and a synchronous electric motor for at times driving the shaft 46 in clockwise direction. In the home position of FIG. 1, starter 44 and shaft 46 are at rest. If starter 44 were to be grasped and turned slightly to the right, as in FIG. 3, it would impart slight rotation to shaft 46 for closing an electric circuit through the drum switch motor, thereby causing the motor to drive the shaft slowly in clockwise direction until starter 44 again reaches the home position of FIG. 1. Whenever starter 44 is in the home position, at which it is substantially perpendicular to the path of coin slide advancement, the circuit of the shaft-driving motor is broken, leaving the starter and shaft 46 at rest.

During power-rotation of shaft 46, various contacts within the drum switch are successively engaged and disengaged to close and open various electric circuits which actuate a dispensing machine, such as, for example, a clothing washer designed to execute a succession of washing, rinsing, and drying operations timed by the drum switch when activated. Thus, the switch during one rotation of its shaft 46, initiates a complete series of operations upon a batch of clothing in return for coins deposited in the coin slide.

The coin mechanism includes means whereby a plurality of complete reciprocations of its coin slide are required for actuating the starter of the dispensing machine. That is, the patron must insert proper coins in the coin slide, then advance and retract the slide, then insert proper coins again, and advance and retract the slide again, this to be repeated three times in the example illustrated by FIGS. 1 to 15, in order to effect operation of the dispensing machine starter 44. Thus, a washing operation costing 90 cents may be obtained, by depositing a quarter and a nickel in the coin slide three times, accompanied by three complete reciprocations of the coin slide. With slight modification of the mechanism, the required repetition may be reduced to two, or increased to four or more, as will be explained. The coin slide apertures 34 may be dimensioned to receive coins of any denomination, or tokens if desired.

With regard to starter 44, it is noted that shaft 46 thereof carries a fixed laterally extending pin 50. A head 52 is rotationally mounted upon shaft 46, and includes an extension 54 into which is threaded an adjusting screw 56 whose forward end may abut a side of pin 50. Starter arm 44 is fixed to head 52. A coil spring 58 (FIG. 9) is arranged to yieldingly urge head 52 in clockwise direction of rotation relative to shaft 46, thereby to normally maintain screw 56 in abutment with the side of pin 50. Since starter arm 44 is fixed to head 52, the head may be rotated by means of arm 44, in either a clockwise or a counterclockwise direction.

If head 52 is rotated clockwise by means of starter arm 44, screw 56 will advance the pin 50 in the same direction, for rotating shaft 46. Shaft 46, as before explained, will in the early stage of its rotation close the electric contacts of a synchronous motor within housing 48, which slowly drives shaft 46 through a cycle of rotation until the shaft and its associated head elements again reach the normal starting position of FIGS. 1, 4 and 9. During the rotation cycle of shaft 46, the drum switch driven by the shaft will successively close and open electrical circuits to execute the washing, rinsing, and drying operations previously mentioned.

Should head 52 be rotated in the opposite, or counterclockwise direction, by means of starter arm 44, screw 56 will simply back away from pin 50 without causing rotation of shaft 46. Spring 58, however, will tend always to return the head to intial position, with screw 56 abutting pin 50 as in FIG. 3. Thus, it will be understood that the spring-biased head constitutes in effect a one-way clutch.

Figures 9, 10, 11, 12, 13, 14, 15:
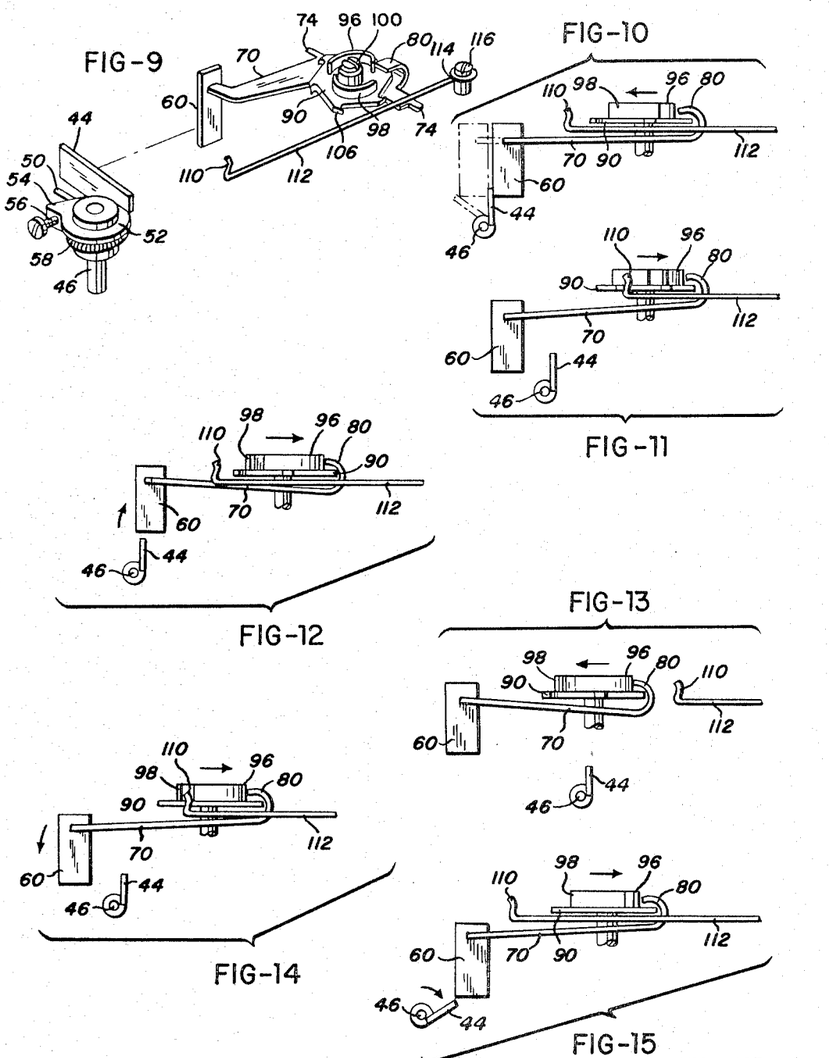
FIG. 9 is a perspective view showing a machine starter and one relationship thereof to an indexable interceptor carried by the indexing unit.
FIG. 10 is a side elevational view of the FIG. 9 elements, in a different relationship.
FIGS. 11 to 15, inclusive, are views similar to FIG. 10 showing the elements in various progressive relationships occurring incident to movements of the coin slide carrying the indexing unit.

In the light of the foregoing explanation, it is apparent that advancement of the coin slide 24 in FIG. 1 may cause a slide-supported interceptor 60 to strike starter arm 44 and rotate the latter counterclockwise, without imparting rotation to shaft 46. This condition is illustrated by FIG. 10. Now as interceptor 60 moves farther, and passes beyond the starter arm 44, the latter will under the influence of spring 58 snap back to initial position, FIG. 13. Upon retraction of the coin slide (FIGS. 14 and 15), interceptor 60 may strike the starter arm and move it clockwise into position for initiating motor rotation of shaft 46, see also FIG. 3. Interceptor 60 under certain conditions may avoid striking and moving the starter arm during retraction of the coin slide, as indicated by FIG. 12, and as will be explained later.

The rear or inner end of coin slide 24 carries a unit for indexing the interceptor 60 to the starter 44, so that the interceptor may actuate the starter only after a required number of coin slide reciprocations has been executed by the patron, with the deposit of a required number of coins. The indexing unit may comprise a frame 62 demountably fixed to coin slide 24 by means of screws 64, the frame being on two levels with an intervening post 66 between (FIG. 2). At one side of the frame is provided guide means 68 for vertically guiding the interceptor 60 in its vertical movements to elevated and lowered positions. Interceptor 60 when lowered, will strike and move the starter 44; when elevated, the interceptor will ride over the top of the starter without contacting it.

Interceptor 60 is to be elevated and lowered by means of a rocker element 70 which is pivoted at 72 upon the frame by means of pintles 74 carried by the rocker element. The rocker element includes a finger 76 having pivotal connection with the interceptor at 78.

Rocker element 70 has formed thereon, along the axis of pintles 74, a rigid cam follower 80 to be actuated by a cam for bodily rocking the rocker element and elevating and lowering the interceptor 60. The rocker element may carry also a leaf spring 79 to rest against the underside of the indexing frame, for biasing the rocker element away from the frame underside. Such biasing of the rocker element may be performed alternatively, or assisted by, a spiral tension spring 82 reaching from a fixed lug 84 of the frame to an extending lug 86 on the rocker element. One of the springs 79 or 82 may be eliminated, if desired.

Upon frame 62, in the vicinity of cam follower 80, is rotatably mounted a cam wheel 90 which has formed upon its periphery a series of equally spaced ratchet teeth 106. Wheel 90 carries also a centrally bored hub 94 flanked by cams 96 and 98 which are adapted to actuate the follower 80 as wheel 90 step-rotates about its stud 100. Step-rotation of wheel 90 is clockwise, with a pawl 102 precluding retrograde movement of the wheel. A spring 104 urges the pawl against the teeth 106 of the cam wheel. A friction washer 108 may be interposed between cam wheel 90 and its supporting frame, to impose a slight drag opposing rotation of the wheel.

With each complete reciprocation of coin slide 24, the cam wheel is rotated a distance equal to the space between two adjacent teeth 106 of the cam wheel. Such partial rotation of the cam wheel is effected by a pawl 110 which may comprise an elongate resilient wire 112 having a mounting end 114 anchored, as by means of screw 116, to a stationary part of the apparatus, for example plate 40, which does not move with coin slide 24.

Whenever coin slide 24 is properly fed with coins, and advanced by means of handle 36, the cam wheel 90 and its supporting frame, advance bodily therewith toward starter 44. With sufficient advancement, cam wheel 90 will reach and pass the stationary pawl 110, the pawl gliding over a tooth 106 of the cam wheel without rotating said wheel. However, on the return or retractile stroke of the coin slide, pawl 110 will engage or hook onto an exposed tooth 106 of the cam wheel, as in FIG. 5, to rotate the cam wheel a distance equal to the space between two successive teeth of the cam wheel. This action may bring cam 96 into the FIG. 5 position for rocking the follower 80 outwardly from the cam wheel, thereby to elevate rocker element 70 and interceptor 60 to the position of FIG. 12, at which the interceptor 60 avoids contact with starter 44. Starter 44 accordingly will not be actuated by interceptor 60, and consequently no action will have been initiated to place an associated dispensing machine in operation.

It may be noted that whenever follower 80 is on one of the cams 96 or 98, interceptor 60 will be held thereby in the elevated or inoperative position of FIG. 12, to preclude actuation of starter 44 by the interceptor. On the other hand, when follower 80 is off of the cams as in FIGS. 14, 15, 8 and 9, the interceptor will be lowered to an operative position for striking and moving the starter as coin slide 24 retracts, thereby to initiate operation of a dispensing machine by reason of starter 44 being moved by interceptor 60 to the operative position of FIG. 3, incident to retraction of coin slide 24 to the right. Retraction of coin slide 24 may be effected or assisted by the action of a coil spring 118 attached thereto.

Figures 6, 7, 8:
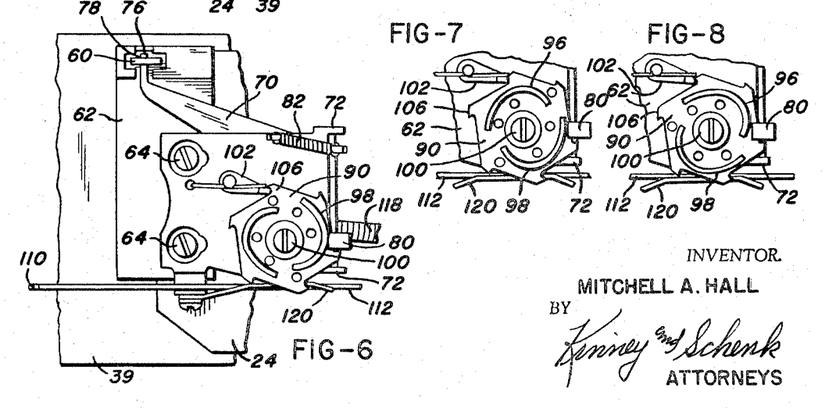
FIG. 6 is a view similar to FIG. 3, but indicating an inoperative condition of the indexing unit.
FIG. 7 is a plan view of a cam wheel of the indexing unit, in the inoperative condition.
FIG. 8 is a view similar to FIG. 7, showing the cam wheel in the operative condition.

In the example illustrated by FIGS. 1 through 15, the cam wheel 90 carries two cams 96 and 98, and a series of ratchet teeth 106 numbering six. The cams are so arranged relative to the ratchet teeth and follower 80, that one of the cams will keep follower 80 depressed during two complete reciprocations of coin slide 24 (FIGS. 6 and 7). Incident to a third complete reciprocation of the coin slide, said one cam will pass beyond the follower (FIG. 8), permitting the follower to move toward the cam wheel axis, and thereby lower the interceptor 60 to the operative position of FIG. 14 for engaging and actuating the starter 44. Thus, at every third complete reciprocation of the coin slide, interceptor 60 will be positioned to actuate starter 44 as the coin slide moves to retracted position. By altering the number of cams and/or ratchet teeth on cam wheel 90, the number of coin slide reciprocations needed for actuating the starter may be increased or decreased, to meet different fee requirements. Various fee requirements may be met further by substituting coin slides having coin apertures 34 dimensioned to receive coins of different denominations.

The reference character 120 indicates simply a guide of stiff but resilient wire, secured to frame 62, and arranged to guide the pawl 110 and prevent its slipping off the ratchet teeth of cam wheel 90 while rotating the cam wheel.

In the modification illustrated by FIGS. 16 through 20, the starter for a service machine or dispenser may be in the form of a normally open electric pushbutton switch 122, the button of which is indicated at 124. The interceptor in this instance may be an elongate plunger or bar 126 which may be swung laterally into and out of longitudinal alignment with button 124, so that the interceptor may depress the switch button if aligned therewith, or avoid depressing the switch button when displaced from alignment. Disalignment of interceptor 126 is shown by broken lines in FIG. 16, and by full lines in FIG. 18.

Figure 16:
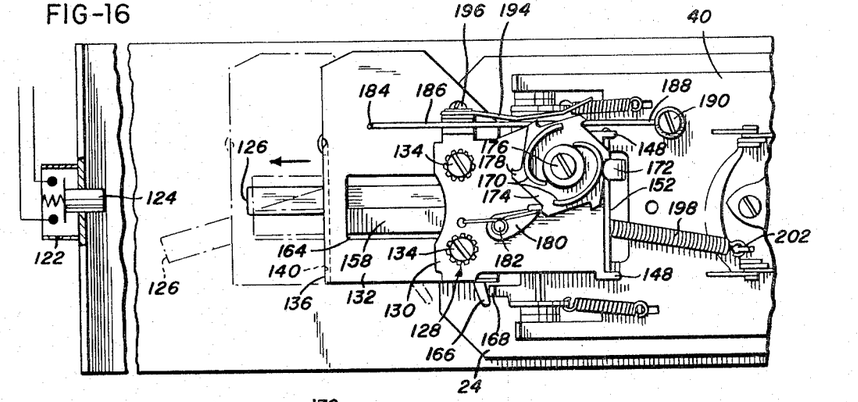
FIG. 16 is a top plan view of a modification.

The coin slide 24 of FIG. 16 may be similar to that of FIG. 1 in all respects, excepting the construction of the indexing unit affixed thereto. The indexing unit 128 may be constituted of two plates 130 and 132, secured to one another on different levels by means of bolts 134. The same bolts or fasteners may be employed to mount the plate unit upon the forward end portion of coin slide 24, detachably by preference, in order to provide for ready substitution of index units.

Figures 17, 18, 19, 20:
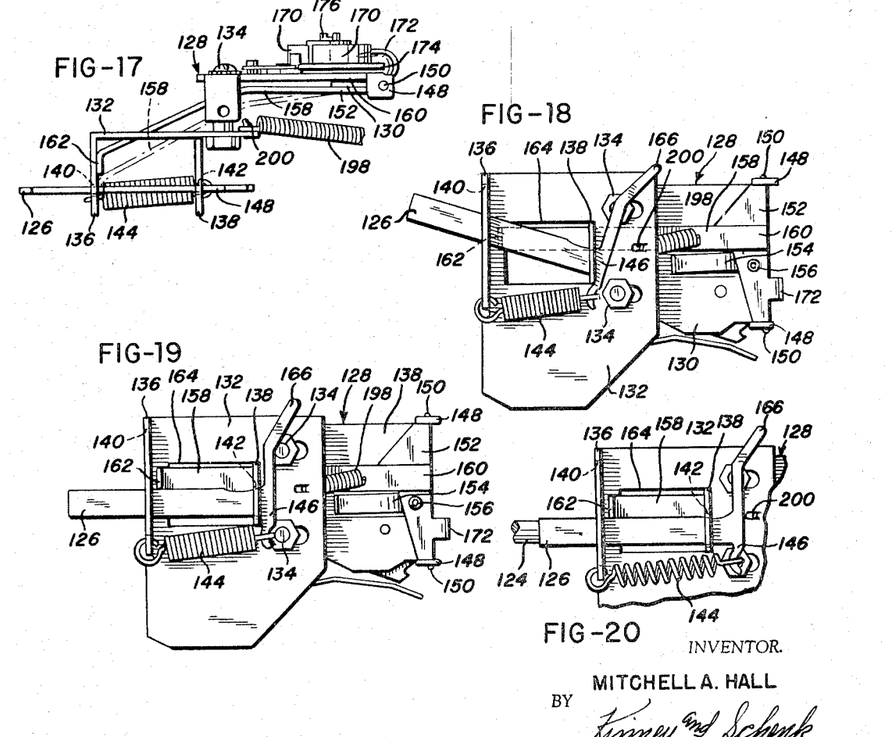
FIG. 17 is a side elevational view of an indexing unit illustrated in plan upon FIG. 16.
FIG. 18 is a bottom plan view of the indexing unit per se, shown in the inoperative position.
FIG. 19 is a view similar to FIG. 18, showing the indexing unit in operative position.
FIG. 20 is a plan view similar to FIG. 19, showing an interceptor of the indexing unit in cushioning condition.

Plate 132 includes two depending wings 136 and 138, which serve to support the interceptor 126 in substantial parallelism with the plate. Wing 136 is provided with an elongate horizontal slot 140 within which the interceptor 126 may be laterally shifted from the operative position of FIG. 19, to the inoperative or offset position of FIG. 18. A slot 142 of lesser length is provided in wing 138, to receive and support the shank of the interceptor for pivot movement laterally. The slots 140 and 142, as indicated by FIG. 20, allow also for longitudinal displacement of the interceptor in opposition to the force of a spring 144, occurring incident to depressing the switch button 124 to its limit of depression. Spring 144 may be anchored to wing 136, and to the head 146 of the interceptor, as shown, for normally holding the head yieldingly against wing 138 as in FIGS. 19 or 18.

The upper plate 130 of the indexing unit may be provided with a pair of depending perforate ears 148 to pivotally support the outwardly extending pintles 150 of a rocker element 152. A leaf spring 154 riveted to the rocker element at 156, or equivalent resilient means, may be employed for yieldingly rotating the rocker element about its pivots 150 away from plate 130, in order to spring-bias an elongate latch 158 which at its end 160 is fixed to the rocker element. The opposite end 162 of the latch depends through an opening 164 in plate 132, and may fall alongside the interceptor 126 as in FIGS. 16, 19 and 20, to maintain a straight-forward disposition of the interceptor in alignment with switch button 124. In the alternative, latch end 162 may be lifted above interceptor 126 as in FIGS. 17 and 18, to permit a disaligned or oblique disposition of interceptor 126 by the action of spring 144 (FIG. 18).

The head 146 of interceptor 126 may be provided with an extending rigid finger 166, which as shown in FIG. 16, engages a stationary abutment 168 each time the coin slide 24 is fully retracted, to swing the interceptor to straight-forward operative position. The interceptor may or may not remain in said operative position, upon subsequent coin slide advancement, depending upon whether or not latch 158 moves to the latching position of FIG. 19. If latch 158 does not move to latching position, interceptor 126 will move to the oblique position of FIG. 18 as soon as finger 166 leaves abutment 168 incident to an advancement of the coin slide. As was previously mentioned, spring 144 normally biases the interceptor toward the oblique position.

The movements of latch 158 are controlled by cams 170, 170, which at times may exert outward force against a cam follower 172, the latter being preferably an integral part of rocker element 152. Cams 170 are fixed upon a cam wheel 174, which may be rotatably mounted upon plate 130 by means of a stud screw 176. Cam wheel carries also a series of peripheral teeth 178, whereby step-rotation of the wheel is effected incident to each retractile movement of coin slide reciprocation. A spring-pressed dog 180 pivoted upon plate 130 at 182, engages teeth 178 to preclude retrograde rotation of the cam wheel, so that the cam wheel may be rotated only in one direction.

For rotating the cam wheel 174 in stepping fashion, there is provided a pawl 184 constituted of an upturned end of an elongate wire 186, the opposite end 188 of which wire is anchored at 190 to the stationary cover plate 40 of the coin slide. The wire has limited lateral resiliency, so that as coin slide 24 is advanced (to the left in FIG. 16), pawl 184 may glide over and past the teeth of the cam wheel, without rotating the wheel, as the entire indexing device advances bodily with the coin slide. By the time the coin slide reaches the position of full advancement, cam wheel will have moved to the left completely beyond pawl 184.

Upon subsequent retraction of the coin slide, pawl 184 will engage one of the teeth 178 of the cam wheel, for rotating the wheel a distance equal to the space between successive teeth thereof. Such partial rotation of the cam wheel moves a cam 170 relative to follower 172. As long as follower 172 remains upon a cam 170, the rocker element and latch 158 will be held elevated to the full-line position of FIG. 17, leaving interceptor 126 free to move to the oblique position of FIG. 18 upon advancement of the coin slide, so that the interceptor is disaligned relative to switch button 124. However, if a cam 170 moves past the follower, allowing the follower to leave the cam, spring 154 will tilt the rocker element and latch 158 downwardly to the broken line position of FIG. 17, at which the latch end 162 engages a side of interceptor 126 to hold the interceptor in straight-forward aligned relationship with switch button 124 (FIG. 19). Accordingly, a full advancement of coin slide 24, along with interceptor 126, causes the interceptor to depress button 124, and close the contacts of switch 122 for initiating actuation of a service machine or dispenser.

To preclude damaging the switch 122 by possible excessive depression of its button 124, interceptor 126 may be cushioned by spring 144, FIG. 20, to relieve excessive pressure upon the switch button 124. That is, interceptor 126 may to some extent move bodily lengthwise through slots 140 and 142, after having fully depressed button 124.

In FIG. 16, the reference numeral 194 indicates simply a resilient wire guide anchored at 196 upon plate 130, to ensure that pawl 184 will remain engaged with a tooth of wheel 174 while step-rotating said wheel during reciprocation of the coin slide. The character 198 indicates a tension spring for returning, or assisting return, of the coin slide to retracted position. For the purpose, one end of spring 198 may be fixed to plate 132 at 200, whereas the opposite end thereof may be attached to a stationary part 202 of the coin slide support.

In the example illustrated by FIGS. 16 through 20, the cam wheel 174 carries two cams 170, 170, and a series of ratchet teeth 178 numbering six. The cams are so arranged relative to the ratchet teeth and follower 172, that one of the cams will keep follower 172 depressed during two complete reciprocations of coin slide 24. Incident to a third reciprocation of the coin slide, said one cam will pass beyond the follower, permitting the follower to move toward the cam wheel axis and thereby lower the latch 158 to operative position for latching the interceptor 126 in straight-forward position, for engaging starter 124 upon subsequent advancement of the coin slide. Thus, at every third complete reciprocation of the coin slide, interceptor 126 will be positioned to actuate starter 124.

By altering the number of cams and/or ratchet teeth on cam wheel 174, the number of coin slide reciprocations needed for actuating the service machine starter may be increased or decreased, to meet different fee requirements of the apparatus. Various fee requirements may be met further, by substituting coin slides 24 having coin apertures dimensioned to receive coins of different denominations. In this connection, it should be understood that the coin slide of FIG. 16 may be identical to that of FIG. 1. Starter 122 may be an electric switch as indicated, or a starter in any other form capable of being actuated by an interceptor such as 126.

The second modification of the apparatus, illustrated by FIGS. 21 through 24, includes a coin slide 24 like that of FIGS. 1 and 16, reciprocable to advanced and retracted positions upon a stationary base plate 26, and having associated therewith the usual stationary cover plate 40 carrying appropriate coin testing devices as previously explained. The retracted and advanced positions of coin slide 24 are indicated in full lines and broken lines, respectively, upon FIGS. 21 and 22.

The starter to be actuated incident to movement of the coin slide, is in this instance shown as a rotary cam 206 fixed upon the rotary shaft 208 of a starter box 210, wherein may be housed an electric switch or other mechanism actuated by a rocking movement of shaft 208 to initiate operation of a dispenser or service machine. Cam 206 has an inclined cam track 214 to be struck by an interceptor 216 carrying a roller 212, the roller serving to climb upon the track for imparting partial rotation to starter shaft 208. A spring 218 may be applied to shaft 208 for returning cam 206 to a normally inoperative position wherever the cam is free of contact with roller 212. The roller is adapted to rotate the cam and shaft 208 to an operative rotated position, for placing the service machine in operation.

Interceptor 216 may be in the form of a substantially L-shaped arm having a down-turned end 219 carrying the roller 212, and an opposite end 220 having pivotal connection at 222 upon a lower frame-plate 224. Plate 224 comprises one part of a frame 226 attached to coin slide 24, which frame includes also an upper plate 228 spaced from and fixed to the lower plate by an upright strut 230. Lower plate 224 may be detachably fixed to the upper face of coin slide 24, by means of screws 232. Plates 224 and 228 are parallel to the coin slide, and are fixed relative thereto.

Figure 21:
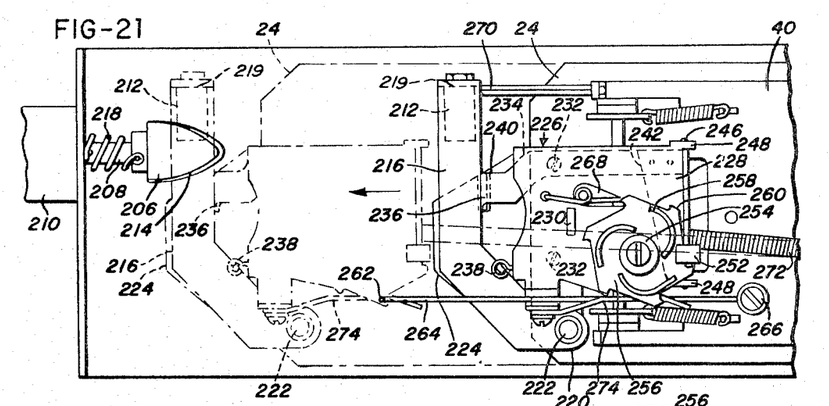
FIG. 21 is a top plan view of a second modification.
Figure 23:
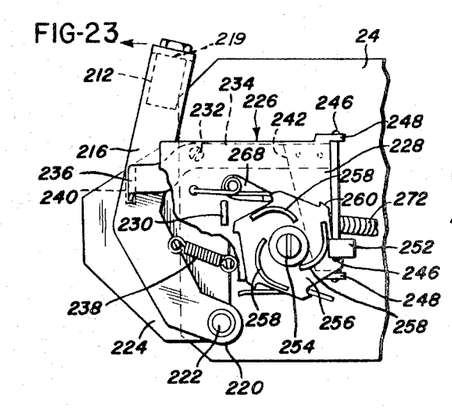
FIG. 23 is a top plan view of an indexing unit included in FIG. 21, but shown in a condition of inoperativeness.
Figure 24:
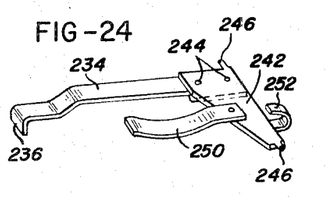
FIG. 24 is a perspective detail view illustrating a rocker element and latch assembly as employed in the second modification.

Interceptor 216 is movable about pivot 222, to either the operative position of FIG. 21, at which it may strike and actuate the starter 206, or to the inoperative position of FIG. 23, at which the interceptor is withdrawn to an oblique position. When in the inoperative or oblique position of FIG. 23, roller 212 of the interceptor will not reach and actuate starter 206 upon full advancement of coin slide 24. Accordingly, such disposition of the interceptor permits actuation of the coin slide without activation of a service machine controlled by starter 206. However, when the interceptor is in the operative or extended position of FIG. 21, it will upon full advancement of the coin slide, reach and actuate starter 206 for placing the service machine in operation.

Figure 22:
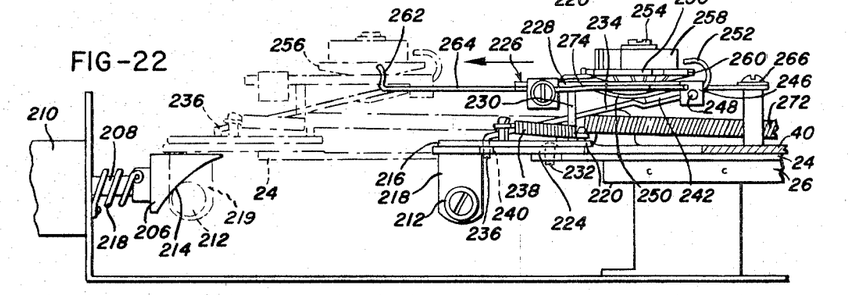
FIG. 22 is a side elevation of the FIG. 21 structure.

Means in the form of a latch 234 is provided, for controlling the position of interceptor 216. The latch may be a strip of metal having a turned end 236 to be placed in obstructing and non-obstructing positions relative to interceptor 216. In FIGS. 21 and 22, latch end 236 rests behind an edge of interceptor 216 to preclude rotation thereof about pivot 222 in clockwise direction, thereby to hold the interceptor in the operative extended position for actuating the starter 206 upon full advancement of the coin slide. Whenever latch end 236 is lifted upwardly out of obstructing relationship with the interceptor, the interceptor may swing clockwise to the inoperative position of FIG. 23, due to the pull of a small spring 238 attached to the interceptor and to frame plate 224. In the elevated position of latch 234, its end 236 overlies interceptor 216, without interferring with pivotal movement of the interceptor.

When latch 234 is lowered, as in FIG. 22, its end 236 may enter a slot 240 in plate 224 for purpose of stability in holding the interceptor extended.

A rocker element 242 has fixed connection to the latch at 244, and includes opposed pintles 246 whereby the rocker element is pivoted upon perforate depending ears 248 formed upon plate 228. Fixed also to the rocker element is a leaf spring 250, which bears against the bottom of plate 228, to bias the rocker element and latch 234 downwardly away from the plane of said plate. Along its rear edge, the rocker element carries a rigid cam follower 252.

Upon the top of plate 228 is rotatably mounted, by means of a stud screw 254, a cam wheel 256 which carries a series of cams 258 clustered about stud 254 in position to strike and move the follower 252 as the cam wheel rotates. When a cam strikes the follower, the follower is moved outwardly to lift the latch 234 and free the interceptor 216. Conversely, when a cam 258 passes by and leaves follower 252, the latch 234 drops downwardly, aided by leaf spring 250, to place latch end 236 in obstructing relationship with interceptor 216 (FIG. 22).

Means are provided for step-rotating cam wheel 256, upon each retractile movement of coin slide 24. Such means may include a series of equally spaced ratchet teeth 260 on the periphery of the cam wheel, to be engaged by a pawl 262 which is fixed with relation to the coin slide movement. The pawl may consist of an upturned end of a stiff elongate wire 264 anchored at 266 upon the stationary cover plate 40 of the coin slide. Wire 264 may have limited lateral resiliency, so that as coin slide 24 is moved to the left, carrying with it the ratchet wheel 256, the teeth of said wheel will glide past pawl 262 without rotating the ratchet wheel. Moreover, any counterclockwise rotation of the ratchet wheel by pawl 262, is precluded by a spring-pressed dog 268 adapted to engage a ratchet wheel tooth.

Upon retraction of coin slide 24 from the broken line position of FIGS. 21 and 22, or to the right, pawl 262 will engage a tooth of the ratchet wheel for step-rotating the wheel a distance of one tooth. Such rotation of the ratchet wheel may place a cam 256 in engagement with follower 252, as in FIG. 23, to elevate latch 236 and free the interceptor 216 for movement to the oblique or inoperative position shown. Accordingly, the next full advancement of coin slide 24 will fail to actuate starter 206, because the displaced interceptor of FIG. 23 will not reach the starter.

A subsequent full advancement and retraction of the coin slide, will again bring a tooth of the ratchet wheel in engagement with pawl 262, this time resulting in movement of a cam 258 away from follower 252 (FIG. 21), thereby permitting the follower to move toward the axis of the ratchet wheel. The latch 234 thereupon will drop down (FIG. 22), aided by spring 250, causing latch end 236 to enter slot 240 and furnish an obstruction to clockwise displacement of interceptor 216. The interceptor therefore, will be held by latch end 236 in the operative position of FIG. 21, so that a subsequent full advancement of the coin slide will cause interceptor roller 212 to actuate the starter 206, and thereby activate the service machine controlled by the starter.

From the foregoing, it will be understood that the ratchet wheel, pawl 262, and latch 234, constitute an indexing means for interceptor 216.

It may here be noted that stationary cover plate 40 carries a fixed abutment, shown in FIG. 21 as a rigid rod 270, adapted to abut and move interceptor 216 to the operative position upon each full retraction of the coin slide. Whether or not the interceptor will remain in that position when the coin slide is next advanced, depends upon the disposition of latch 234 as determined by the presence or absence of a cam 258 in positioning the follower 252. Under the conditions depicted by FIG. 21, interceptor 216 is held in operative position by latch 234, for actuating the starter 206 upon full advancement of the coin slide. If follower 252 in FIG. 21 were on a cam 258, latch 234 would be withdrawn from obstructing relationship with interceptor 216, and a forward advancement of the coin slide would therefore permit the interceptor to assume the inoperative position of FIG. 23.

In each of FIGS. 21, 22 and 23, the numeral 272 indicates a tension spring arranged to normally assist retraction of coin slide 24, substantially as explained in the description of FIGS. 1 and 16. The numeral 274 indicates a wire guide operative to ensure engagement of pawl 262 with a tooth of ratchet wheel 256 while the coin slide and indexing means are under retraction, as explained in the description of FIGS. 1 and 16.

In the example illustrated by FIGS. 21 through 24, the ratchet wheel 256 is shown as having six teeth and three cams, these being arranged so that every other complete reciprocation of the coin slide will result in disposition of interceptor 216 to operative position. The number of cams and ratchet teeth, however, is subject to variation in order that the number of coin slide reciprocations needed to actuate the service machine starter may be altered. Furthermore, the coin slide may be provided with coin-receptive apertures dimensioned to accommodate coins of various denominations, thereby to establish a proper fee for the service desired.

The coin slide and the indexing device of FIGS. 21 through 24 may be quite similar to those described in explaining FIGS. 1 and 16, and are subject to the same modifications for altering the fee requirements. As in FIGS. 1 and 16, the modified device of FIG. 21 may carry an indexing unit which is bodily detachable from the coin slide, for purpose of substitution. The nature of the coin testing devices applied to the several forms of coin-controlled actuation herein disclosed, is a matter of immateriality to the present invention.

It is to be understood that various modifications and changes may be made in the structural details of the devices herein disclosed, within the scope of the appended claims, without departing from the spirit of the invention.

What is claimed is:

1. A coin-controlled actuator for a service machine starter, which starter is movable from a normally inoperative position to an operative position, said actuator comprising in combination: an elongate coin-receptive coin slide, a support therefor along which the coin slide is manually shiftable longitudinally between a normal position of retraction and an extended position of advancement, a starter interceptor, means on the coin slide supporting the interceptor for disposition to one of two positions upon each full advancement of the coin slide, and, at one of which positions the interceptor strikes and moves the starter to operative position, and at the second of which positions the interceptor avoids moving the starter to operative position, and means indexing the interceptor to operative position only upon execution of a plural number of coin slide reciprocations.

2. A coin-controlled actuator for a service machine starter including an arm shiftable from a normal inoperative position to an operative position, said actuator comprising in combination: an elongate coin-receptive coin slide, and means supporting the coin slide for manual reciprocation between a normal position of retraction and an extended position of advancement, a frame fixedly mounted upon one end of the coin slide, an upright guide on the frame, and an elongate interceptor bar slidable in the guide transversely of the path of movement of the coin slide, said interceptor bar being movable between an operative position at which said bar strikes and moves the starter arm to operative position, and an inoperative position at which said bar avoids striking said interceptor bar, upon reciprocation of the coin slide, a rocker element comprising an extending arm and a rigid cam follower, means pivoting the rocker element upon the frame near the cam follower, and means pivoting the rocker arm upon an end of the interceptor bar, whereby pivoting of the rocker element upon the frame disposes said interceptor bar to the operative and inoperative positions thereof, a movable cam means on the frame to engage and disengage the follower upon movement of the cam means, and means including a stationary pawl carried by the slide support means, operative to move the cam means and maintain the rocker element in position for maintaining an inoperative condition of the interceptor bar during a predetermined number of reciprocations of the coin slide.

3. The combination as set forth in claim 2, wherein the frame carrying the cam means, the rocker element, and the interceptor bar, is detachable from the coin slide for purpose of substitution.

4. A coin-controlled actuator for a service machine starter including an arm shiftable from a normal inoperative position, to an operative position for initiating actuation of the service machine, said actuator comprising in combination: an elongate coin-receptive coin slide, and means supporting the coin slide for manual reciprocation between a normal position of retraction and an extended position of advancement, a frame detachably mounted upon one end of the coin slide for bodily movement therewith, a guide on the frame, and an elongate interceptor bar slidable in the guide transversely of the path of reciprocation of the coin slide, said interceptor bar being shiftable between an operative position at which said bar strikes and moves the starter arm to operative position, and an inoperative position at which said bar avoids striking said interceptor bar, upon reciprocation of the coin slide, a rocker element comprising an extending arm and a rigid cam follower, means pivoting the rocker element upon the frame near the cam follower, and means pivoting the rocker arm upon an end of the interceptor bar, whereby pivotal movement of the rocker element upon the frame disposes said interceptor bar to the operative and inoperative positions thereof, a cam wheel rotatable upon the frame, a plurality of cams on said wheel each adapted, upon rotation of the cam wheel, to abut and depress the cam follower for rocking the rocker element and disposing the interceptor bar to inoperative position, and means for imparting step-rotation to the cam wheel incident to each complete reciprocation of the coin slide, for exposing the follower to movement by the cams, the cams each being of such length as to depress the follower once during at least two successive reciprocations of the coin slide.

5. The device as set forth in claim 4, wherein the combination includes means for yieldingly urging the interceptor bar constantly toward the operative position thereof.

6. A coin-controlled actuator comprising in combination: a service machine starter including a rotary drum-switch shaft having a free end, a head on the free end of said shaft, and cooperative over-running clutch means on the head and the shaft whereby rotation of the head in one direction only may impart rotation to the shaft, an extending arm fixed upon the starter head for disposition at a normal inoperative position of extension, an elongate coin-receptive coin slide, and means supporting the coin slide for manual reciprocation at substantial right angles to the normal direction of extension of the starter arm, the coin slide being reciprocable between a normal position of retraction and an extended position of advancement, a frame mounted upon one end of the coin slide for bodily movement therewith, a guide on the frame, and an elongate interceptor bar movable within limits established by the guide, said bar being shiftable transversely of the path of reciprocation of the coin slide, between an operative position at which said bar strikes and moves the starter arm to operative position, and an inoperative position at which said bar avoids striking said starter arm, upon reciprocation of the coin slide, a rocker element comprising a rocker arm and a rigid cam follower, and means pivoting the rocker arm to an end of the interceptor bar, whereby pivotal movement of the rocker element disposes said interceptor bar to the operative and inoperative positions thereof, said interceptor bar when disposed to operative position and advanced by the coin slide, being operative to strike the starter arm and move the latter in the direction of over-run of the clutch, thereby leaving the starter shaft immobile, a cam wheel rotatable upon the frame, a plurality of cams on said wheel each adapted, upon rotation of said wheel, to abut and depress the cam follower for disposing the interceptor bar to inoperative position, and means for imparting step-rotation to the cam wheel incident to each retraction step-rotation to the cam wheel incident to each retraction of the coin slide, for exposing the follower to movement by the cams, the cams each being of such length as to depress the follower during at least two successive reciprocations of the coin slide.

7. The device as set forth in claim 6, wherein the frame carrying the cam wheel, the rocker element, and the interceptor bar, is detachable from the coin slide for purpose of substitution.

8. A coin-controlled actuator for a service machine starter, which starter is depressable from a normal inoperative position to an operative position, said actuator comprising in combination: an elongate coin-receptive coin slide, and means supporting the coin slide for manual reciprocation between a normal position of retraction and an extended position of advancement, a frame detachably mounted upon one end of the coin slide for bodily movement therewith, an elongate interceptor having an end to contact and depress the starter to operative position, means mounting the interceptor upon the frame for shifting movement of said end into and out of operating alignment with the starter, whereby the interceptor may selectively engage or avoid engagement with the starter incident to full advancements of the coin slide, and means indexing the interceptor to alignment with the starter only upon execution of a plural number of coin slide reciprocations.

9. The device as set forth in claim 8, wherein the combination includes means for cushioning the interceptor against excessive depression of the starter while moving the starter to operative position.

10. A coin-controlled actuator for a service machine starter, which starter is longitudinally depressable from a normal inoperative position to an operative position, said actuator comprising in combination: an elongate coin-receptive coin slide, and means supporting the coin slide for manual reciprocation between a normal position of retraction and an extended position of advancement, a frame detachably mounted upon one end of the coin slide for bodily movement therewith, an elongate interceptor having an end to contact and longitudinally depress the starter to operative position, means mounting the interceptor upon the frame for shifting movement of said end into and out of operating alignment with the starter, whereby the interceptor may selectively engage or avoid engagement with the starter upon full advancement of the coin slide, yielding means normally biasing the interceptor to a position of disalignment with the starter, means operative upon each retraction of the coin slide, for aligning the interceptor with the starter, a latch on the frame movable to and from an obstructing position with relation to the interceptor, for selectively holding the interceptor in the aforesaid aligned position during a full advancement of the coin slide, and means operative once during a plural number of coin slide advancements, for maintaining the latch in unobstructing position with relation to the interceptor.

11. The device as set forth in claim 10, wherein the combination includes means for cushioning the interceptor against excessive depression of the starter while moving the starter to operative position.

12. A coin-controlled actuator for a service machine starter, which starter is longitudinally depressable from a normal inoperative position to an operative position, said actuator comprising in combination: an elongate coin-receptive coin slide, and means supporting the coin slide for manual reciprocation between a normal position of retraction and an extended position of advancement, a frame mounted upon one end of the coin slide for bodily movement therewith, an elongate interceptor having a free end to contact and longitudinally depress the starter to operative position, said interceptor including a head, and a shank intermediate the head and said free end, guide means on the frame supporting the interceptor shank for shifting movement longitudinally of the coin slide, and laterally of said slide, yielding means operative upon the interceptor head to normally bias the free end of the interceptor laterally out of alignment with the starter, with said free end projected in the general direction of coin slide advancement, an extending finger on the head, and a stationary abutment on the coin slide support to contact and move the finger for aligning the free end of the interceptor with the starter upon each full retraction of the coin slide, a latch on the frame movable to and from an obstructing position with relation to the interceptor, for selectively holding the interceptor in the aligned position aforesaid during an advancement of the coin slide, means operative once during a plural number of successive coin slide advancements, for maintaining the latch in unobstructing position with relation to the interceptor, thereby to free the interceptor to the biasing action of the yielding means aforesaid, and means operative during other coin slide advancements, for moving the latch to obstructing position relative to the interceptor, and for holding the interceptor in operating alignment with the starter.

13. The device as set forth in claim 12, wherein the means last mentioned comprises: a cam follower on the latch, a cam wheel rotatable upon the frame, a plurality of cams on said wheel each adapted, upon rotation of the cam wheel, to abut and depress the follower for shifting the latch from obstructing position relative to the interceptor, and means for imparting step-rotation to the cam wheel incident to each complete reciprocation of the coin slide, for exposing the follower to movement by the cams, said cams each being of such length as to depress the follower once during at least two successive reciprocations of the coin slide.

14. A coin-controlled actuator for a service machine starter, which starter is longitudinally depressable from a normal inoperative position to an operative position, said actuator comprising in combination: an elongate coin-receptive coin slide, and means supporting the coin slide for reciprocation between a normal position of retraction and an extended position of advancement, a frame mounted upon one end of the coin slide for movement bodily therewith, an elongate interceptor having a free end to contact and longitudinally depress the starter to operative position, said interceptor including a head, and a shank intermediate the head and said free end, guide means on the frame supporting the interceptor shank for shifting movement laterally of the direction of coin slide advancement, yielding means operative upon the interceptor head to normally bias the free end of the interceptor laterally out of alignment with the starter, a fixed extending finger on the head, and a stationary abutment on the coin slide support to contact and move the finger for aligning the free end of the interceptor with the starter upon each full retraction of the coin slide, at latch pivoted upon the frame for movement to and from an obstructing position with relation to the interceptor, for selectively holding the interceptor in the aligned position aforesaid during an advancement of the coin slide, means operative once during a plural number of successive coin slide advancements, for maintaining the latch in unobstructing position with relation to the interceptor, thereby to free the interceptor to the biasing action of the yielding means aforesaid, and means operative during other coin slide advancements, for moving the latch to obstructing position relative to the interceptor, and holding the interceptor in operating alignment with the starter.

15. The device as set forth in claim 14, wherein the combination includes means for cushioning the interceptor against excessive depression of the starter while moving the starter to operative position.

References Cited by the Examiner
UNITED STATES PATENTS

| | | | |
|---|---|---|---|
| 3,155,211 | 11/1964 | Morris et al. | 194—1 |
| 3,237,466 | 3/1966 | Purtilo | 194—9 |

ROBERT B. REEVES, *Primary Examiner.*

STANLEY H. TOLLBERG, *Examiner.*